Oct. 6, 1964  F. RITTER ETAL  3,151,977
PROCESS FOR THE PREPARATION OF MAGNESIUM BY ELECTRO-THERMAL
REDUCTION OF CALCINED DOLOMITE
Filed Oct. 13, 1961
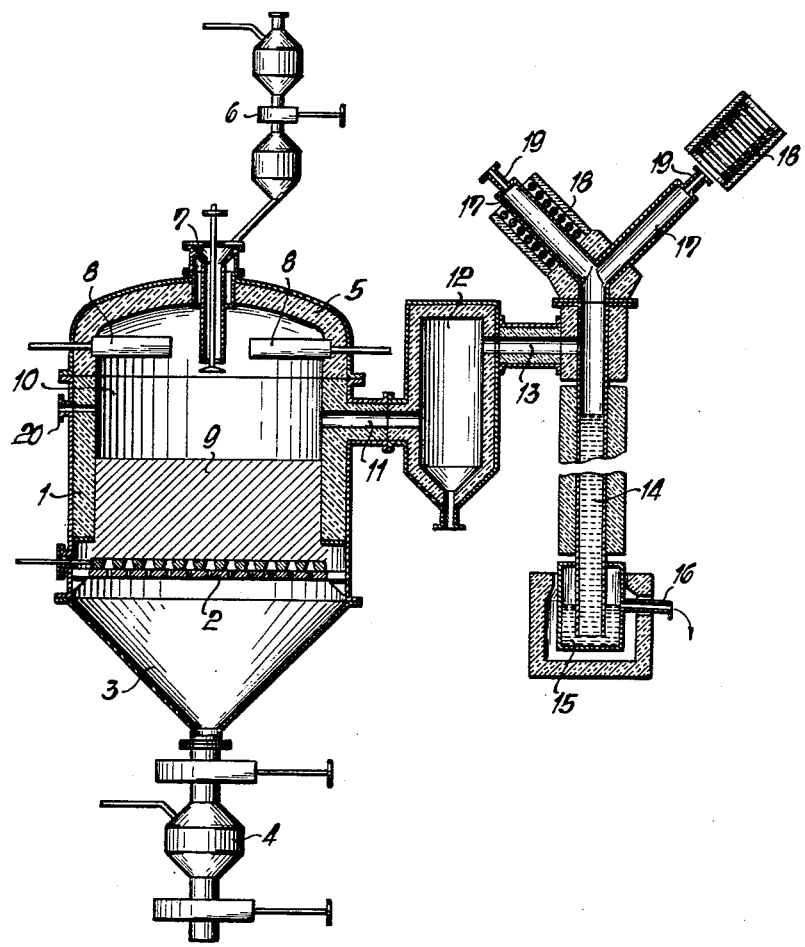
INVENTORS
FRIEDBERT RITTER
OTTO BRETSCHNEIDER
GERHART JAEKEL
HERBERT DISKOWSKI
BY Connolly and Hutz
ATTORNEYS 3,151,977
PROCESS FOR THE PREPARATION OF MAGNESIUM BY ELECTRO-THERMAL REDUCTION OF CALCINED DOLOMITE
Friedbert Ritter, Buschhof uber Konigswinter, Otto Bretschneider, Bonn-Venusberg, and Gerhart Jaekel and Herbert Diskowski, Knapsack, near Cologne, Germany, assignors to Knapsack-Griesheim Aktiengesellschaft, Knapsack, near Cologne, Germany, a corporation of Germany
Filed Oct. 13, 1961, Ser. No. 144,881
Claims priority, application Germany Oct. 18, 1960
4 Claims. (Cl. 75—67)

It is known to produce magnesium in an electrothermal process by reducing pure magnesium oxide or magnesium oxide including other oxidic material with metallic reducing agents. This process yields as the only volatile reduction product vaporous magnesium which is precipitated and removed in solid and/or liquid form. It is also known to carry out this reduction under reduced pressure while having regard to the temperature-dependent reaction pressure curve of the system. Apart from a few exceptions, the energy necessary for the reaction is transmitted by radiation on the surface of the reaction mixture. Thus, for example, the energy is radiated on the surface of the reaction mixture, distributed in a thin layer and motionless in the horizontal direction, the hot residue remaining after the reaction being gradually lowered in the reaction chamber and serving as a support for newly introduced reaction mixture. In order to obtain a fairly high space-time yield per furnace, the surface of the reaction mixture is radiated with the highest density of energy possible. In practice the upper limit of admissible density of energy in determined by the behaviour of the reaction mixture which depends on the high temperatures used. In reducing calcined dolomite, e.g., with ferrosilicon, it is impossible to surpass surface temperatures of 1650° C., as othewise the reaction mixture will sinter too much so that the reaction residue cannot be lowered uniformly through the discharge grating. The baking on of the reaction mixture at the walls of the furnace which may occur in consequence of the high temperatures, is prevented by introducing a sliding layer between the furnace walls, the reaction mixture, and the reaction residue.

A surplus of calcined dolomite prevents the reaction mixture from sintering together, and enables the radiation density to be increased at a constant surface temperature because the primarily relatively great difference in temperature permits the energy absorbed by the reaction mixture as sensible heat to be transmitted faster than the energy additionally required for carrying out the reaction. The quantity of energy necessary for heating a stoichiometrically composed reaction mixture of calcined dolomite and ferrosilicon to the reaction temperature of 1600° C. amounts to 2.0 kwh. at a conversion of 85% and referred to 1 kg. of magnesium. In addition thereto, 2.8 kwh. are required for the chemical conversion process.

The energy radiated to heat the dolomite surplus used which, for a surplus of 100% over the quantity stoichiometrically required, amounts to 1.4 kwh., again referred to 1 kg. of magnesium, is not entirely lost for the process as the reduction of the calcined dolomite e.g., with 75% ferrosilicon proceeds down to temperatures of about 1100° C. at a still remarkable velocity, and as the quantity of heat accumulated in the surplus of dolomite and in the reaction residue can be used in the temperature range between 1600 and 1100° C. for carrying out the reaction which anyhow is going on slower during the last third of time. In view of the high stratification of the reaction residue and the reaction mixture, the known processes leave ample time for carrying out this last step of the reaction under the surface of the reaction mixture, especially as the poor heat-conducting reaction residue substantially dissipates heat to the exterior only immediately before it is being removed.

It is admittedly known art to apply more calcined dolomite than corresponds to the stoichiometric quantity. In conventional processes however, the surplus of dolomite removed together with the reaction residue was considered useless and therefore limited to about 30%.

According to the present invention a great excess over the quantity stoichiometrically necessary of comminuted, calcined, and dust-free dolomite together with a comminuted dust-free metallic reducing agent, for example, ferrosilicon, is introduced in loose layer form into the reaction chamber of an electrothermal reduction furnace, heated under reduced pressure above the solidus line of the metallic reduction agent, unreduced dolomite is recovered from the reaction residue by separation, and again used.

Before calcining the dolomite, its grain-size is reduced to between 0.5 and 20 mm.

As it must not contain any dust particles, it is exposed during the calcination process to fire-gases after it has been comminuted.

The dolomite still hot from the heat of the calcination furnace, is introduced into the reduction furnace, and at the same time, but already under reduced pressure, comminuted ferrosilicon is added. In the furnace, the dolomite current and the ferrosilicon form a loose mixture which is conveyed to the reaction zone.

The dolomite brought into the reaction mixture surpasses the amount stoichiometrically required by 50 to 200%, preferably 100%. The ferrosilicon which is intended to act as reducing agent is applied with a silicon content of preferably 70 to 80 percent preferably 75%.

The reaction is carried out under a pressure of 1 to 100 mm. of mercury.

As soon as the silicon content of the ferrosilicon has been reduced to about 33%, the reaction is stopped and the excess of unchanged dolomite is removed together with the actual reaction residue.

The dolomite contained in the material discharged is then separated from the actual residue by sieve separation below a temperature of 675° C., and while hot is again brought into the reaction zone either alone or in a loose mixture with freshly calcined dolomite and ferrosilicon.

Seen from the chemical point of view, the reaction on which this process is based, proceeds according to the well-known equation

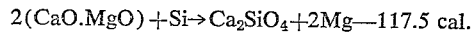

$$2(CaO.MgO)+Si \rightarrow Ca_2SiO_4+2Mg-117.5 \text{ cal.}$$

If no side-reactions were to be considered, i.e., if pure starting material and pure silicon were used, the reaction process would be complete and under otherwise identical conditions, the space-time yield would depend merely on the amount of heat introduced in the proper temperature range.

The upper limit for the quantity of energy to be radiated per square unit on the surface of the reaction mixture with the aid of the heating units disposed in the reduction furnace is determined by the temperature of 1600° C. on the surface of the reaction mixture which as mentioned above should not be exceeded during operation.

It has been found that the upper limit for the whole amount of heat which acts upon the reaction mixture at a certain time, may be still essentially extended if in addition to the amount of heat radiated per unit of time on to the surface of the reaction mixture a further amount of heat is convectively introduced under the surface.

According to the present invention, heat is transmitted under the surface of the reaction mixture by using an amount of calcined dolomite surpassing by 50–200% the theoretical amount. The reaction mixture is distributed as usual in a thin layer on the surface of the reaction mixture already present in the reduction furnace, then heated by radiation, and gradually lowered as further quantities of reaction mixture are introduced and residue is removed, while the sensible heat is entrained.

This excess of dolomite, surpassing the theoretical amount by 50 to 200% is required merely to act as a heat carrier but not for chemical reasons.

The excess of dolomite is continuously removed, while hot, together with the reaction residue which essentially consists of calcium orthosilicate $Ca_2SiO_4$. As calcium orthosilicate undergoes modification at 675° C. and the modification formed at a lower temperature disintegrates due to an increase of volume, the excess of dolomite removed together with the residue can easily be separated from the calcium orthosilicate by sieve separation and may be introduced again, while hot, if desired into the reduction furnace.

The reason why the reaction is stopped when the silicon content of the reducing agent has reached about 33% is that the quantities of silicon available for the reduction of magnesium oxide are then consumed.

By "silicon available for the reduction" is understood that part of the introduced reducing agent, which is left after deduction of the quantities necessary for reducing the undesired accompanying substances (as e.g., $Fe_2O_3$, $MnO_2$, $ZnO$, and alkalies), and the quantities of silicon necessary for obtaining the silicides of the non-volatile metals.

The silicides which occur in the reaction residue along with the metallic accompanying substances can be recovered in known manner and again used for one purpose or another, possibly after a new enrichment with silicon.

A reduction furnace suitable for use in carrying out the process according to the present invention is shown diagrammatically in the accompanying drawing.

The actual reduction furnace 1, lined in known manner and vacuum-tight, has at its bottom the grating 2 whereupon lie reaction residue and reaction mixture. Underneath grating 2 is the lower part of the furnace 3 extending to discharge opening 4, which enables the reaction residue to be removed, but prevents outside air from penetrating into the furnace. Reduction furnace 1 and reaction chamber 10 (above reaction mixture 9) are covered by the furnace cover 5 in which are disposed heating means 8, and inlet opening 7, which serves to distribute uniformly the different reaction substances introduced through feeding device 6 in a thin layer on to the surface of the reaction mixture already present in the reduction furnace.

The magnesium vapor formed in the course of the reaction is conveyed from reaction chamber 10 through overflow conduit 11 into purification chamber 12 by means of a carrier gas inert towards magnesium vapor (e.g., hydrogen or noble gases, especially argon) and blown in through short pipe 20, freed in the purification chamber from dusty and vaporous contaminations, and then conveyed via overflow conduit 13 to the condenser. In the condenser, pressure and temperature are kept at heights which enable a fairly great part of the arriving purified magnesium vapor to be precipitated in liquid form.

For instance, it is possible to so arrange the apparatus that two columns 14 and 15 containing liquid condensate are formed which correspond to a "barometric column," and are kept in equilibrium by the outside air pressure. Excess condensate is removed through an overflow pipe till the equilibrium is again obtained.

The remaining part of the magnesium vapor is condensed in crystalline form in one of the solid condensers 17. As soon as this condenser is full of solid magnesium, it is separated from the vacuum pipe connected with short pipe 19; then the solid magnesium is molten out with the aid of heating coils 18 and mixed with condensate 14 already present in liquid form. At the same time, a solid condenser 17 is connected with the vacuum pipe after heating coils 18 have been removed or switched off so that continuous working is possible.

As disclosed in the following example, a special advantage of the procedure according to the present invention is an essential increase of the space-time yield when compared with other known processes.

*Example*

In a vacuum apparatus the reaction mixture was distributed over an area of 3.14 m.$^2$ (diameter 2.0). The surface whereupon the reaction mixture was strewed in a uniformly thin layer, was kept at a constant temperature of 1600° C. by radiation from above. The reaction mixture was stoichiometrically composed (in relation to the total amount of silicon) of 100 kg. calcined dolomite having a grain size of 0.5 to 20 mm. and containing 37.0% MgO, and of 17 kg. ferrosilicon of 75% strength having a grain size from 0.5 to 4 mm. Only 300 kg. per hour of mixture could be strewed on to the surface of the reaction mixture; the reaction mass was flushed with 1.6 Nm.$^3$ of hydrogen gas per hour and a yield of 47 kg. of magnesium per hour was obtained.

The same vacuum furnace was charged with a reaction mixture containing 200 kg. of dolomite in an excess of 100%, a calcined dolomite per 17 kg. of ferrosilicon, 700 kg. of reaction mixture per hour could be applied at a constant surface temperature of 1600° C. When scavenged with the above indicated amount of hydrogen gas, a yield of 59.5 kg. of magnesium per hour was obtained. The residue (640 kg. per hour) which consisted of actual reaction residue and of excess dolomite and having a specific heat of 0.2 cal./gr. yielded a convectively entrained amount of heat of 51,000 cal. per hour when cooled from 1600° C. at the surface to 1200° C. in lower layers. By means of this amount of heat, 21 kg. of magnesium per hour were obtained below the surface of the reaction substance. The result is that, when using an excess of dolomite of 100%, only 65% of the total yield is produced on the surface by direct radiation, and 35% by heat which is convectively transported under the surface together with the reaction residue and the excess dolomite.

After having been cooled down to a temperature below 675° C., the reaction residue was passed through a sieve having a width of mesh of 0.5 mm. The fine portion thereby obtained amounted to 294 kg. with a content of calcined dolomite of 25% (including the excess of lime present in the reacted dolomite)+69% of calcium orthosilicate+6% of 33% ferrosilicon. (This powder was thrown away.) The coarse portion amounting to 346 kg. contained 93% of calcined dolomite+4% calcium orthosilicate+3% of 33% ferrosilicon.

We claim:

1. In the process for the manufacture of magnesium by electrothermal reduction of comminuted and calcined dolomite wherein the steps of
 (A) introducing a reaction mixture of the dolomite and a metallic reducing agent initially into the reduction zone of a reducing furnace under reduced pressure
 (B) radiating heat to the surface of the reaction mixture thereby causing reduction of the dolomite, the formation of reaction residue and evolution of magnesium vapor
 (C) adding additional reaction mixture of the dolomite and metallic reducing agent to the reducing zone on top of the reaction residue
 (D) radiating heat to the surface of the additional reaction mixture thereby causing reduction of the newly added dolomite, the formation of additional reaction residue and evolution of additional magnesium vapor and
 (E) removing from said reduction zone a lower portion of the reaction residue while maintaining the upper portion of said reaction residue as support for the newly introduced reaction mixture are repeated, the improvement which comprises forming the reaction mixture of steps A and C by mixing hot and dust-free comminuted dolomite with a comminuted and dust-free metallic reducing agent, said dolomite being in an excess of between 50 and 200 percent over the stoichiometric amount of reducing agent present and removing the lower portion of the reaction residue remaining after reduction together with unreduced dolomite and separating unreduced dolomite from the residue.

2. The process of claim 1 wherein the dolomite comminuted to a grain size of 0.5 to 20 mm. and calcined while exposed to the draft of fire gases is introduced while hot into the reduction zone of the reduction furnace.

3. The process of claim 1 wherein the ferrosilicon is used as the reducing agent and contains initially 70 to 80% by weight of silicon and the process is continued until the silicon content of the ferrosilicon is about 33% by weight.

4. The process of claim 3 wherein the reaction residue is removed from the reduction zone and the unreduced excess dolomite admixed therein is separated at a temperature below 675° C. by sieve separation from the main mass of the reaction residue, said reaction residue consisting essentially of calcium orthosilicate and ferrosilicon containing about 33% by weight of silicon.

References Cited in the file of this patent

UNITED STATES PATENTS

| | | |
|---|---|---|
| 2,582,120 | Hansgirg | Jan. 8, 1952 |
| 2,583,351 | Bassereau | Jan. 22, 1952 |
| 2,847,295 | Bretschneider et al. | Aug. 12, 1958 |
| 2,920,951 | Bretschneider et al. | Jan. 12, 1960 |
| 2,934,423 | Bretschneider et al. | Apr. 26, 1960 |
| 2,971,833 | Artru et al. | Feb. 14, 1961 |

OTHER REFERENCES

Metals Handbook, 1948, American Society for Metals, Cleveland, Ohio, page 13.